(12) United States Patent
Bickford et al.

(10) Patent No.: US 8,010,916 B2
(45) Date of Patent: *Aug. 30, 2011

(54) TEST YIELD ESTIMATE FOR SEMICONDUCTOR PRODUCTS CREATED FROM A LIBRARY

(75) Inventors: Jeanne Bickford, Essex Junction, VT (US); Markus Buehler, Weil im Schoenbuch (DE); Jason D. Hibbeler, Williston, VT (US); Juergen Koehl, Weil im Schoenbuch (DE)

(73) Assignee: International Business Machines Corporation, Armonk, NY (US)

(*) Notice: Subject to any disclaimer, the term of this patent is extended or adjusted under 35 U.S.C. 154(b) by 694 days.

This patent is subject to a terminal disclaimer.

(21) Appl. No.: 12/062,586

(22) Filed: Apr. 4, 2008

(65) Prior Publication Data
US 2008/0189664 A1    Aug. 7, 2008

Related U.S. Application Data

(63) Continuation of application No. 11/163,696, filed on Oct. 27, 2005, now Pat. No. 7,386,815.

(51) Int. Cl.
    G06F 17/50       (2006.01)
(52) U.S. Cl. .......................................................... 716/56
(58) Field of Classification Search .................. 716/4, 5, 716/19–21, 56; 702/82, 118; 714/718; 324/760, 324/765
See application file for complete search history.

(56) References Cited

U.S. PATENT DOCUMENTS

| | | | |
|---|---|---|---|
| 6,044,208 A | 3/2000 | Papadopoulou et al. | |
| 6,317,859 B1 | 11/2001 | Papadopoulou | |
| 6,738,954 B1* | 5/2004 | Allen et al. | 716/56 |
| 6,834,375 B1* | 12/2004 | Stine et al. | 716/56 |
| 6,918,101 B1 | 7/2005 | Satya et al. | |
| 2003/0046608 A1* | 3/2003 | Bartenstein et al. | 714/29 |
| 2005/0071788 A1 | 3/2005 | Bickford et al. | |
| 2005/0158888 A1 | 7/2005 | Stine et al. | |
| 2006/0101355 A1* | 5/2006 | Ciplickas et al. | 716/2 |

* cited by examiner

*Primary Examiner* — Vuthe Siek
(74) *Attorney, Agent, or Firm* — Gibb I.P. Law Firm, LLC; Richard M. Kotulak, Esq.

(57) ABSTRACT

Disclosed is a method that predicts test yield for a semiconductor product, prior to design layout. This is accomplished by applying a critical area analysis to individual library elements that are used to form a specific product and by estimating the test yield impact of combining these library elements. For example, the method considers the test yield impact of sensitivity to library element to library element shorts and the test yield impact of sensitivity to wiring faults. The disclosed method further allows die size growth to be traded off against the use of library elements with higher test yield in order to provide an optimal design solution. Thus, the method may be used to modify library element selection so as to optimize test yield. Lastly, the method further repeats itself at key design checkpoints to revalidate initial test yield (and cost) assumptions made when the product was quoted to a customer. Thus, the method provides increased accuracy of test yield estimate from initial sizing through design and further allows designs to be modified to improve test yield.

13 Claims, 5 Drawing Sheets

| Library Element Identifiers | Size (x,y) | FEOL Faults Sensitivity | BEOL Faults Sensitivity | FEOL Shorts Factor | |
|---|---|---|---|---|---|
| 10 | 2, 2 | 300 | 200 | 50 | |
| 20 | 3, 2 | 310 | 250 | 10 | |
| 30 | 2, 1 | 200 | 100 | 40 | |
| 40 | 3, 4 | 350 | 400 | 50 | |
| n | | | | | |

TEST YIELD ESTIMATE FOR SEMICONDUCTOR PRODUCTS CREATED FROM A LIBRARY

CROSS-REFERENCE TO RELATED APPLICATIONS

This application is a continuation of U.S. application Ser. No. 11/163,696 filed Oct. 27, 2005, the complete disclosure of which, in its entirety, is herein incorporated by reference.

BACKGROUND OF THE INVENTION

1. Field of the Invention

The invention generally relates to estimating test yields for semiconductor products. More particularly, the invention relates to estimating a test yield for a semiconductor product that can be created from multiple library elements based on a critical area analysis of each of the library elements, an estimation of library-element-to-library-element shorting and an estimation of product-level wiring faults sensitivity.

2. Description of the Related Art

Many semiconductor products and, particularly, application specific integrated circuits (ASICs), are formed by combining pre-designed units (i.e., integrated circuit library elements) that are organized by circuit type. Each prefabricated unit or library element includes a set of integrated circuit devices that are wired together so that they perform a specific function. Currently, critical area analysis techniques (e.g., techniques based on dot-throwing, geometric expansion, Voronoi diagrams, etc.) are used to accurately estimate test yield loss in semiconductor products. These techniques are used to estimate test yield loss caused by sensitivity to random defects and, typically, are only performed after a product design layout is completed, for example, by performing analysis on the final merged physical design data for the product. However, current methods for estimating product test yield prior to product design layout, which predict test yield based on product size and/or circuit, gate or pin counts, are not as accurate. Thus, oftentimes pre- and post-product design layout test yield estimates are not the same. Since product cost estimates and/or quotes based on test yield estimates are generally provided to a customer before the design of a product is set out, a method is needed to provide a more accurate pre-product design layout test yield estimate.

SUMMARY OF THE INVENTION

In view of the foregoing an embodiment of the invention provides a method for estimating the test yield for a semiconductor product prior to developing a product design layout.

The method comprises establishing a library comprising a set of library elements in which each library element is a pre-designed unit that includes a set of integrated circuit devices that are wired together so that they perform a specific function. Each of the library elements in the set is inventoried and organized by circuit type so that they can be mixed and matched with each other to form various different semiconductor products (e.g., application specific integrated circuits (ASICs)).

Once a library is established, a front end of the line (FEOL) faults sensitivity (including FEOL sensitivity to opens, shorts, and via blockages), a back end of the line (BEOL) faults sensitivity (including sensitivity to BEOL opens, shorts, and via blockages) and an inter-element shorts sensitivity for each library element can be estimated (e.g., by using critical area analysis techniques based on dot-throwing, geometric expansion, Voronoi diagrams, etc.). Specifically, the shorts sensitivity can be estimated by performing a critical area analysis in which for each library element in the set, an edge perimeter is identified, an amount of the edge perimeter that is active (i.e., an active edge perimeter) is identified, and then a probability is calculated that this identified active edge perimeter will be positioned within the product adjacent another active edge perimeter of another library element. A sensitivity information database can be established and the estimated sensitivity information for each library element can be maintained in the database. The sensitivity information database may be accessed, e.g., when selecting library elements and when estimating test yield (see discussion below). The information maintained in the database for each library element may include, but is not limited to, the following: a library element identifier, a size (x,y) of the library element, an estimated FEOL faults sensitivity, an estimated BEOL faults sensitivity, and an estimated shorts sensitivity.

Once the sensitivity information database is established, existing library element selection tools can be used to identify library elements that are needed to form a product (e.g., an ASICs). In one embodiment of the method two or more library elements that are needed to form the product are selected from the library (i.e., they are selected from the set of library elements). After selecting the two or more library elements, a product-level wiring faults sensitivity is estimated based on the wire length required to connect the selected library elements within the product. The wire length required for the product can be estimated based on either the estimated product size and/or the estimated number of circuits, gates, or pins in the product. The estimated wire length can then be used to estimate the expected number of faults associated with the wiring.

Once the product-level wiring faults sensitivity is determined, a test yield estimate for the product is computed based on a sum of the front end of the line faults sensitivities for the selected library elements, the shorts sensitivities for the selected library elements and the wiring faults sensitivity for the product. A cost estimate for the product is then determined based on the test yield estimate. This pre-product design layout cost estimate may be used as the basis for an initial price quote to the customer. Lastly, the initial test yield and cost estimates may be periodically validated by repeating the process at key design check points in order to verify the accuracy of the initial price quote.

In another embodiment of the method at least two groups of library elements are selected which can be used to form the specific product. Each group can be selected by selecting at least two library elements from the set (i.e., from the library) such that, when combined, the selected library elements can form the product. Two groups may be distinguished simply by a single substitute library element or by multiple different library elements. Then, different product-level wiring faults sensitivities for the product as formed by each of the different groups of selected elements can be estimated, as described above. Test yield estimates for the product as formed by each of the different groups are also estimated, as described above.

Additionally, this embodiment further comprises selecting one of the groups to form the product based on the test yield estimates. A group of library elements may be selected because it produces the highest (i.e., best) test yield estimate. Alternatively, a group of library elements may be selected as a function of both test yield estimate and product size. For example, the selection of a group, and particularly, the selection of library elements in a group, can be made by balancing product size versus test yield to provide an optimal solution.

Thus, product size growth can be traded off against the use of a combination of library elements that produce a higher test yield.

Again, as with the previously described embodiment, a cost estimate for the product (as formed by the selected group) is then determined based on the test yield estimate. This pre-product design layout cost estimate may be used as the basis for an initial price quote to the customer. Lastly, the initial test yield and cost estimates may be periodically validated by repeating the process at key design check points in order to verify the accuracy of the initial price quote and, optionally, to make modifications to the design.

These and other aspects of embodiments of the invention will be better appreciated and understood when considered in conjunction with the following description and the accompanying drawings. It should be understood, however, that the following description, while indicating preferred embodiments of the invention and numerous specific details thereof, is given by way of illustration and not of limitation. Many changes and modifications may be made within the scope of the embodiments of the invention without departing from the spirit thereof, and the invention includes all such modifications.

BRIEF DESCRIPTION OF THE DRAWINGS

The embodiments of the invention will be better understood from the following detailed description with reference to the drawings, in which.

DETAILED DESCRIPTION OF PREFERRED EMBODIMENTS OF THE INVENTION

Figure 1:
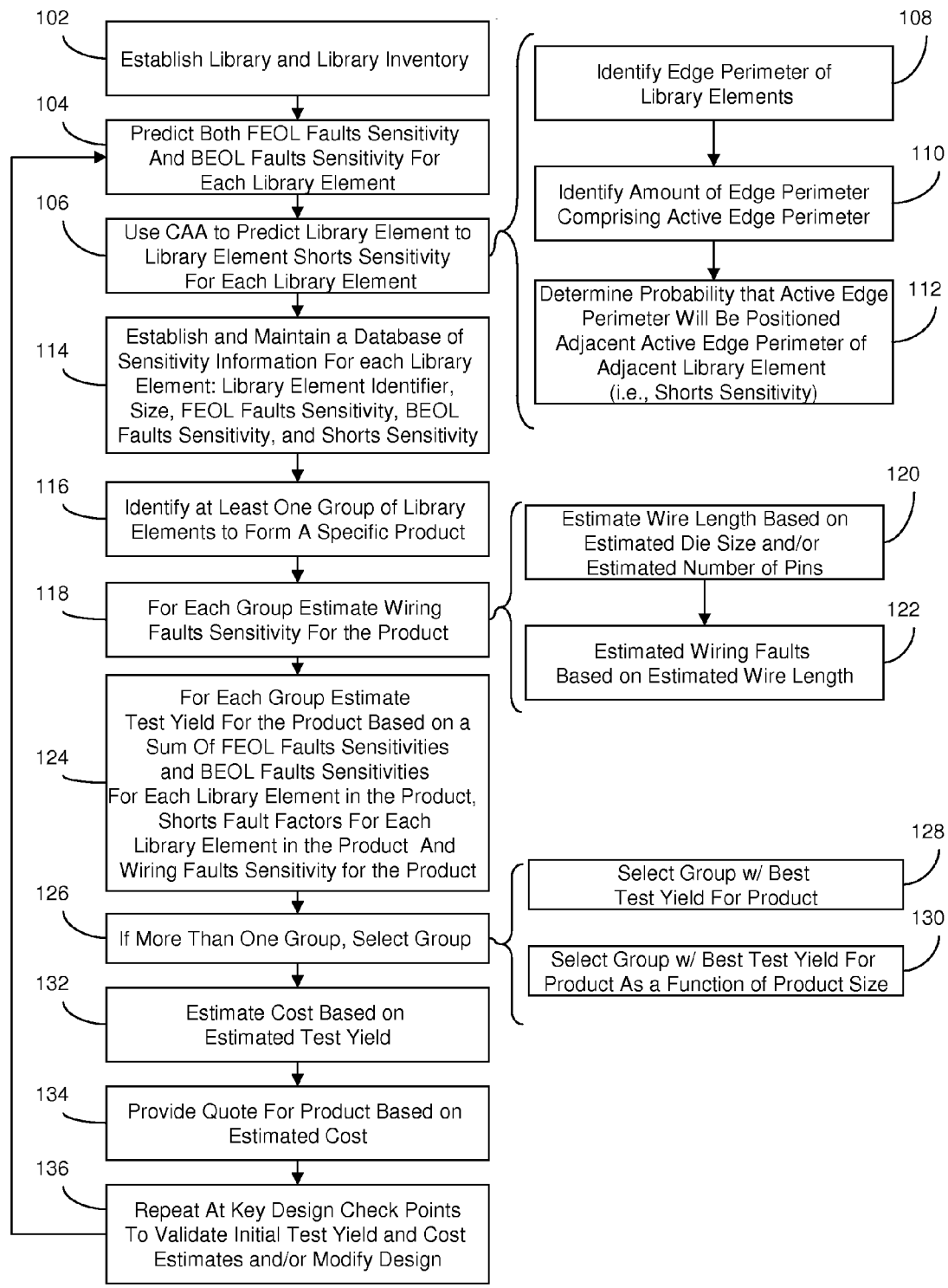
FIG. 1 is a schematic flow diagram illustrating an embodiment of the method of the invention.

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the invention.

As mentioned above, current methods for estimating product test yield prior to laying out the product design, e.g., by methods which predict test yield based on product size or circuit, gate or pin counts, are not very accurate. Oftentimes pre- and post-product design layout test yield estimates are not the same. Since product cost estimates and/or quotes based on test yield estimates are generally provided to a customer before the design of a product is laid out due to cost associated with design layout, a method is needed to provide a more accurate pre-product design layout test yield estimate. Therefore, the disclosed method predicts test yield (i.e., manufacturing yield) for a semiconductor product, prior to design layout. This is accomplished by applying a critical area analysis to individual library elements that are used to form a specific product and by estimating the test yield impact of combining these library elements. For example, the method considers the test yield impact of sensitivity to library-element-to-library-element shorts and the test yield impact of sensitivity to wiring faults. The disclosed method further allows die size growth to be traded off against the use of library elements with higher test yield in order to provide an optimal design solution. Thus, the method may be used to modify library element selection so as to-optimize test yield. Lastly, the method further repeats itself at key design checkpoints to revalidate initial test yield (and cost) assumptions made when the product was quoted to a customer.

Figure 2:
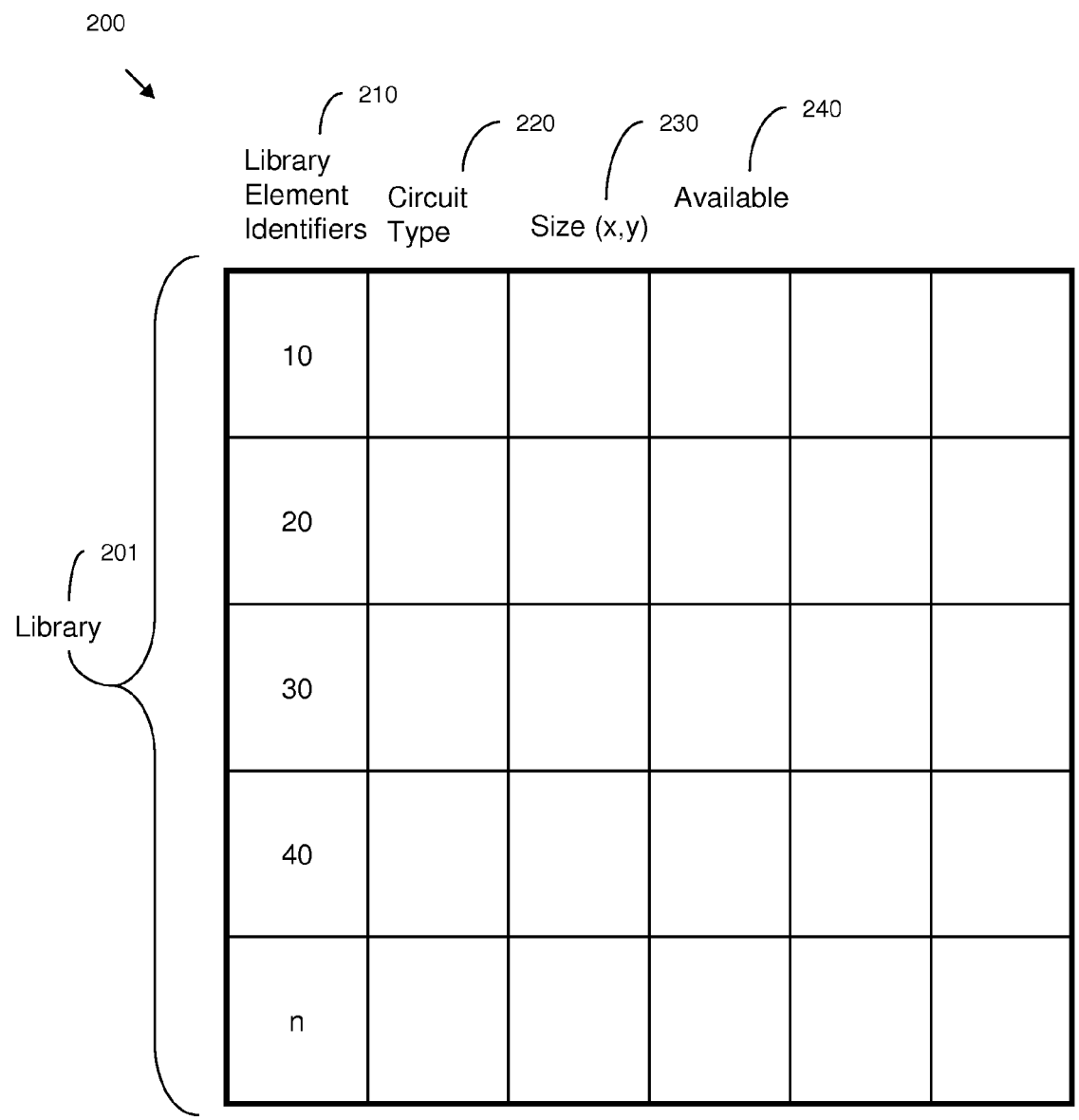
FIG. 2 is a table illustrating data contained in an inventory of library elements in a library.
Figure 3:
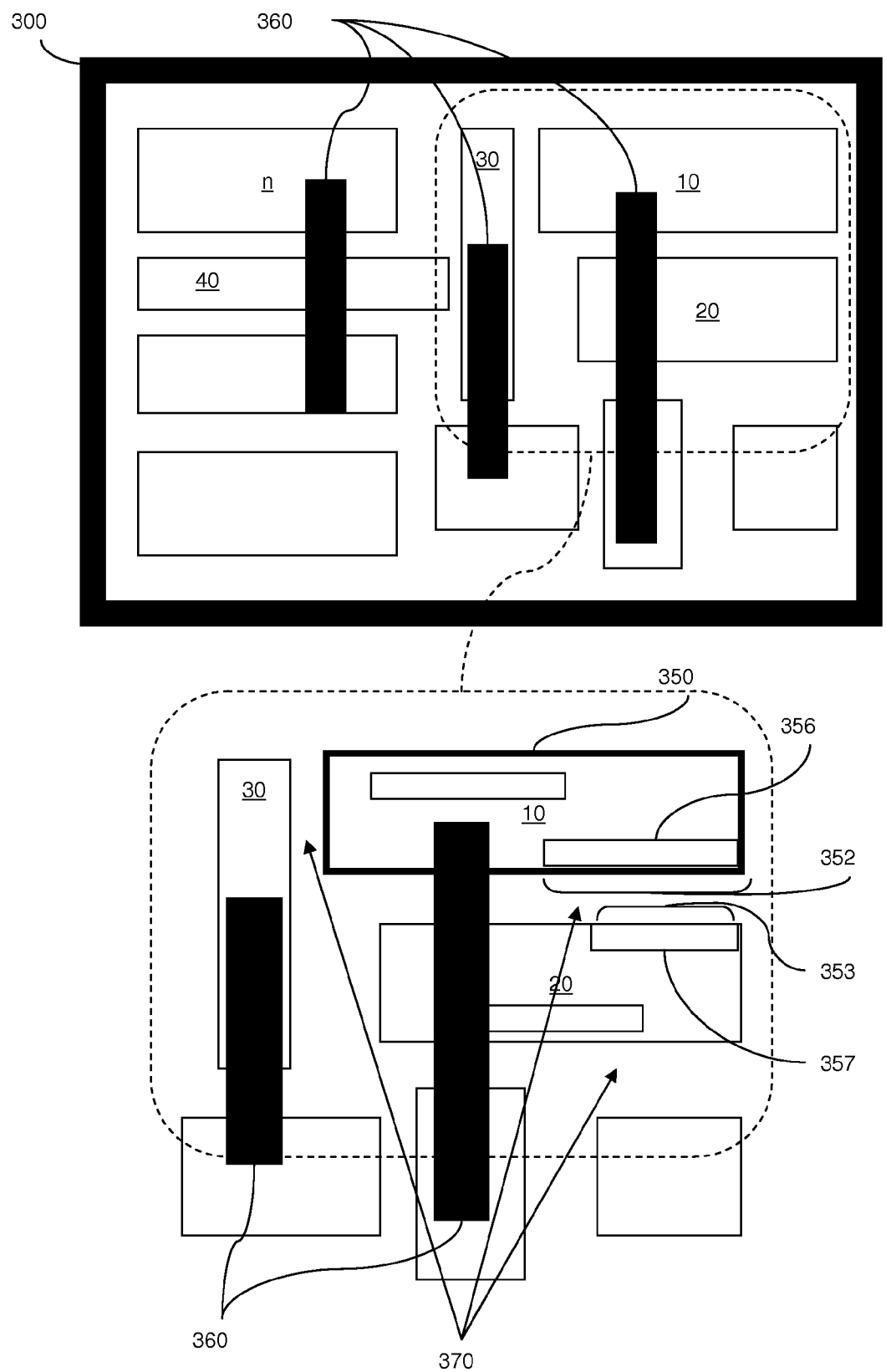
FIG. 3 is a schematic block diagram of an exemplary semiconductor product formed using multiple library elements.

More particularly, referring to FIG. 1 process 102 and FIG. 2 in combination, the method comprises establishing a library (i.e., a supply) 201 comprising a set of library elements in which each library element 10-$n$ is a pre-designed unit that comprises a set of integrated circuit devices that are wired together so that they perform a specified function. An inventory 200 of each of the library elements 10-$n$ can be maintained such that each library element 10-$n$ is identified by an identifier 210 and categorized by circuit type 220. The inventory 200 can include additional information such as library element sizes 230, availability of library elements 240, etc. The inventory 200 can be accessed and used to mix and match the different library elements 10-$n$ with each other to form various different semiconductor products (e.g., application specific integrated circuits (ASICs)), by employing existing tools such as existing die size estimate tools that are adapted to select library elements to form a specified product and to estimate amount clock and timing circuits. For example, as illustrated in FIG. 3, either a single library element or a product 300 (e.g., a die) can be formed by wiring together (e.g., with product level wiring 360) a plurality of library elements 10-$n$.

Once the library 201 is established, for each library element 10-$n$ in the set, a front end of the line (FEOL) faults sensitivity, a back end of the line (BEOL) faults sensitivity and a shorts sensitivity can be estimated (e.g., predicted by using existing critical area analysis techniques based on dot-throwing, geometric expansion, Voronoi diagrams, etc.) (see processes 104-106). Specifically, again referring to FIG. 3, FEOL faults factors (e.g., sensitivity in the manufacturing layers that form transistors, resistors, capacitors, etc., or sensitivity created by library element to library element placement), BEOL faults factors (e.g., wiring within each library element) and shorts sensitivity (i.e., the sensitivity to shorts that will develop in the space between a given library element (e.g., library element 10) and other library elements (see e.g., spaces 370) can be estimated by performing a critical area analysis (see process 104-106). The critical area analysis is performed for each library element in the set by first identifying edge perimeters (e.g., edge perimeter 350, including depth, of element 10, as illustrated in the exploded view of FIG. 3) (see process 108) by masking level and then determining a probability at each level of the edge perimeter creating a fault. For example, there are different FEOL and BEOL masking levels so that the probabilities determined for each level provide the FEOL fault sensitivity and BEOL faults sensitivity, respectively. Then, an amount of that edge perimeter for each level that is active (i.e., an active edge perimeter 352) is identified (see process 110). Specifically, the amount of the edge perimeter that is active is determined by identifying and measuring that amount (i.e., length) of the edge perimeter at which structures contained within the library element are located (e.g., active edge perimeter 352 corresponding to structure 356 of library 10).

This identified amount of active edge perimeter 352 for the library element 10 is used to calculate the probability that the active edge perimeter will be positioned in the product adjacent to another active edge perimeter of another library element (e.g., adjacent to active edge perimeter 353 of structure 357 of library element 20) (see process 112). Specifically, physical design data for each library element is enclosed with all design layers in a physical design data box. The minimum distance for library-element-to-library-element placement allowed in the router is used as the distance between the box and the library element. Critical area analysis (for shorts only) is performed for each library element. Samples of Library element families (e.g., SRAMs, combinational logic, phase lock loops, etc) are evaluated to determine typical area placement adjacent to library elements by inspecting sample designs. The percentage of adjacent area is determined. The faults seen with critical area analysis are multiplied by the percent of adjacent area to determine the library element to library element shorts factor.

Figure 4:
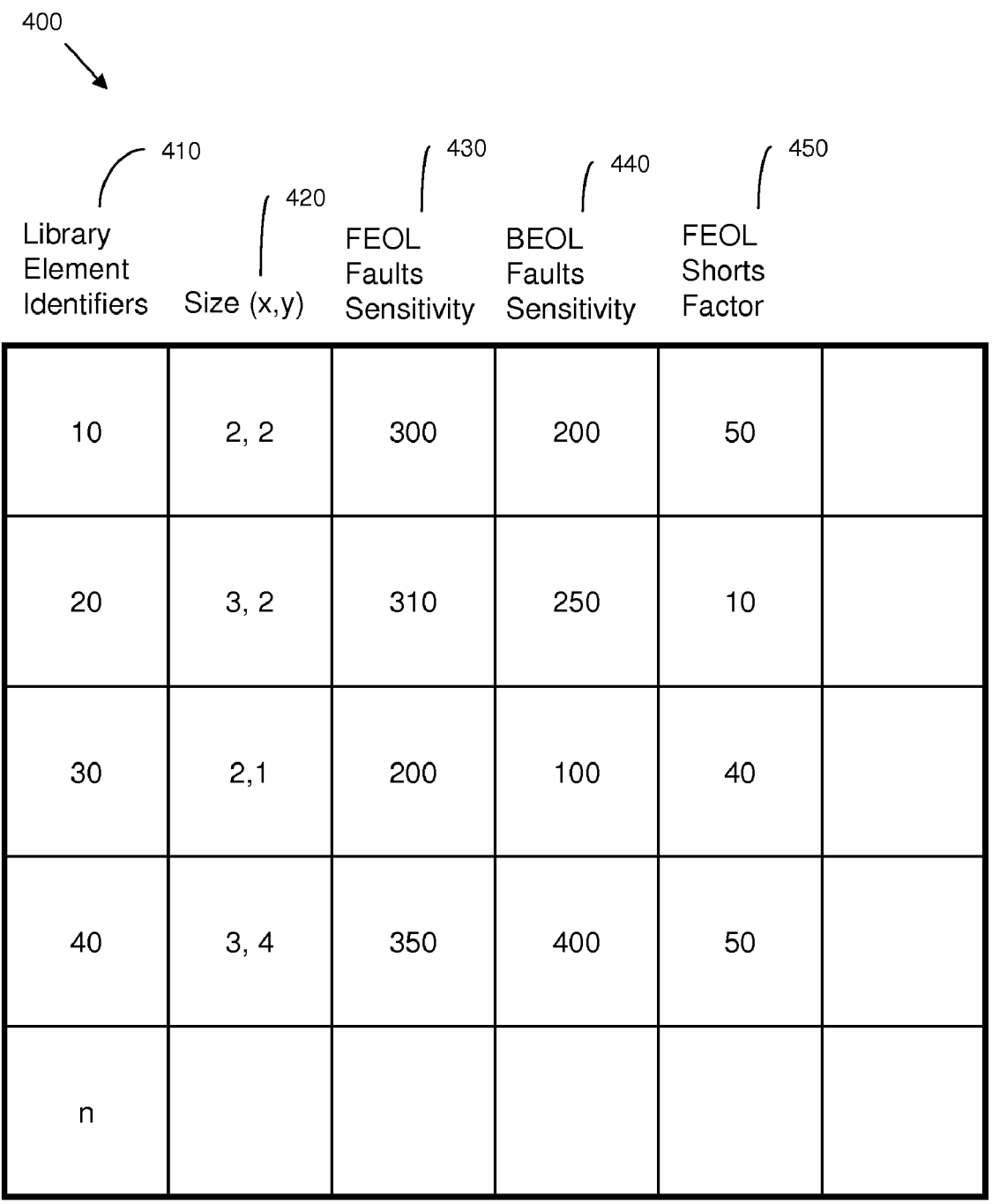
FIG. 4 is a table illustrating data contained in an exemplary sensitivity information database.

A database can be established and the estimated sensitivity information for each library element can be maintained in the database (see process 114). For example, as illustrated in FIG. 4, the sensitivity information data 400 may contain sensitivity information relating to each library element 10-n and, specifically, may include, but is not limited to, the following data: library element identifiers 410, sizes (x,y) of each library element 420, estimated FEOL faults sensitivities 430, estimated BEOL faults sensitivities 440, estimated shorts sensitivities 450, etc. This sensitivity information database 400 may be accessed, e.g., when selecting library elements (see discussion of process 116 below) and when estimating test yield (see discussion of process 124 below).

Once the sensitivity information database 400 is established (at process 114), existing library element selection tools can be used to identify library elements that are needed to form a product (e.g., an ASIC) (see process 116).

In one embodiment of the method two or more library elements (i.e., a group of two or more library elements) that are needed to form the product are selected from the library (i.e., they are selected from the set of library elements) at process 116. In order to accomplish this selection process, existing product (i.e., die) size estimate tools that are adapted to select library elements based on product requirements, circuit types, and optionally, test yield estimates can be linked to the library inventory 200 of FIG. 2 and/or the sensitivity information database 400 of FIG. 4.

Figure 5:
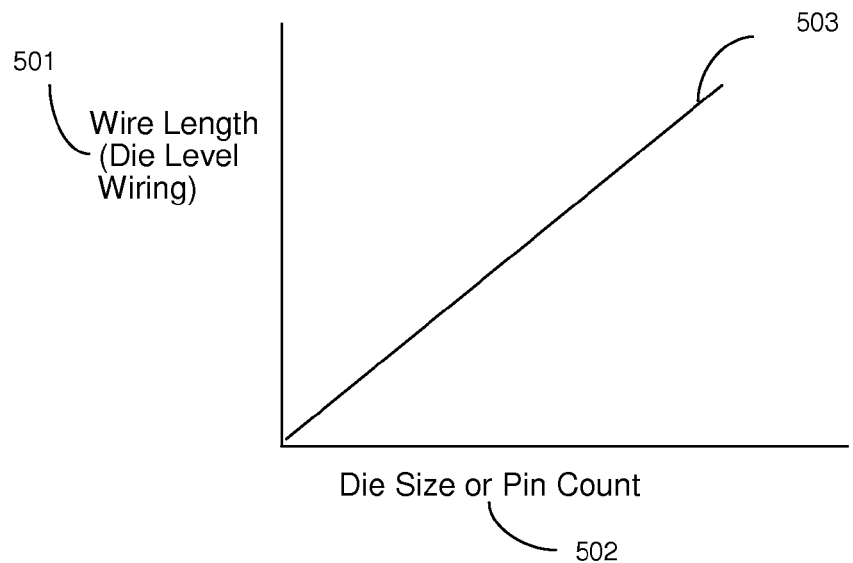
FIG. 5 is a graph illustrating an approximately linear relationship between product wire length and product size or pin count.
Figure 6:
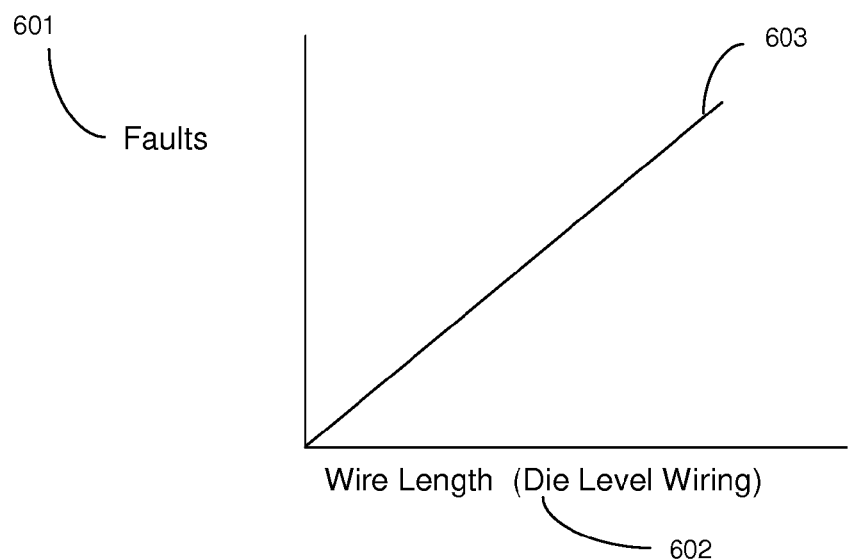
FIG. 6 is a graph illustrating an approximately linear relationship between estimated wire length for a product and estimated wiring faults.

After a group of two or more library elements are selected, a wiring faults sensitivity for the product, as formed with the selected library elements, is estimated (at process 118) based on the wire length required for the product level (i.e., die level) wiring (e.g., as illustrated by wires 360 of FIG. 3 which connect library elements) of the product. Specifically, as illustrated in FIG. 5, the estimated wire length 503 required for the product can be estimated (at process 120) based on an approximately linear relationship that is known to exist between either the estimated product size and/or the estimated number of circuits, gates, or pins in the product 502 and the actual wire length 501. Wiring within each library element is not considered during this process as it is considered during the critical area analysis that predicts FEOL and BEOL faults sensitivity for each library element at process 104. Then, as illustrated in FIG. 6, the estimated number of expected faults 603 for the product can be estimated (at process 122) based on an approximately linear relationship that is known to exist between the estimated wire length 602 and the observed faults 601.

In order to obtain the wiring faults sensitivity based on the estimated number of expected faults a sample of representative products in the design system of interest are used to determine the relationship between chip level (generated by the router tool used to create the wires) and/or die size or pin count. Specifically, the wirelength added during chip design is the output provided by the routers. The number of pins and/or the die size are determined by design. The physical design data for wires generated by the router (for these representative parts) are run through critical area analysis to determine the number of faults. The number faults is then correlated to die size and/or pin count. The fault versus wirelength correlation is then used to estimate faults for new products.

Then, a test yield estimate for the product is computed at process 124 based on a sum of the front end of the line faults sensitivities for the selected library elements, the shorts sensitivities for the selected library elements and the wiring faults sensitivity for the product The following example, referring to the data contained in the sensitivity information database 400 of FIG. 4, illustrates the test yield estimation process if library elements 10 and 20 are selected at process 116 to form a product and the wiring faults sensitivity for the product is determined at process 118 to be 1120 (i.e., 610 plus 60 plus 450). Then, existing test yield estimate tools can access the sensitivities information database 400 and use the expected number of faults along with the die size to estimate test yield.

A cost estimate for the product is then determined at process 132 based on the test yield estimate from process 124. This pre-product design layout cost estimate may be used as the basis for an initial price quote to the customer (see process 134). Lastly, the initial test yield and cost estimates may be periodically validated by repeating the process at key design check points in order to verify the accuracy of the initial price quote (see process 136).

In another embodiment of the method at least two groups of library elements are selected at process 116 which can be used to form the specific product. Each group can be selected by selecting at least two library elements from the set (i.e., from the library) such that, when combined, the selected library elements can form the product. The groups may be distinguished by containing all different library elements, multiple uses of the same library element, and/or a single substitute library element. As with the previously described embodiment, in order to accomplish this selection process, existing product (i.e., die) size estimate tools that are adapted to select library elements based on product requirements, circuit types, and optionally, test yield estimates can be linked to the library inventory 200 of FIG. 2 and/or the sensitivity information database 400 of FIG. 4.

Then, wiring faults sensitivities for the product as formed by each of the groups of selected elements can be estimated, as described above (see process 118). Test yield estimates for the product as formed by each of the groups are also estimated, as described above (see process 124).

This embodiment further comprises selecting one of the groups to form the product based on the test yield estimates (at process 126). For example, a group of library elements can be selected to form the product because it produces the highest (i.e., best) test yield estimate (see process 128). Alternatively, a group of library elements may be selected to form the product as a function of both test yield estimate and product size (see process 130). For example, the selection of a group, and particularly, the selection of library elements that make up a group, can be made by balancing product size versus test yield to provide an optimal solution. Thus, product size growth can be traded off against the use of a combination of library elements that produce a higher test yield.

Again, as with the previously described embodiment, a cost estimate for the product (as formed by the selected group) is then determined based on the test yield estimate (at process 132). This pre-product design layout cost estimate may be used as the basis for an initial price quote to the customer (at process 134). Lastly, the initial test yield and cost estimates may be periodically validated by repeating the process at key design check points in order to verify the accuracy of the initial price quote and/or to modify the design (at process 136).

Embodiments of the method, as described above, can be implemented using entirely hardware, an entirely software or both hardware and software elements. In a preferred embodiment, the invention is implemented using software, which includes but is not limited to firmware, resident software, microcode, etc. Furthermore, embodiments of the method can be implemented using a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Therefore, disclosed is a method that predicts test yield for a semiconductor product, prior to design layout. This is accomplished by applying a critical area analysis to individual library elements that are used to form a specific product and by estimating the test yield impact of combining these library elements. For example, the method considers the test yield impact of sensitivity to library element to library element shorts and the test yield impact of sensitivity to wiring faults. The disclosed method further allows die size growth to be traded off against the use of library elements with higher test yield in order to provide an optimal design solution. Thus, the method may be used to modify library element selection so as to optimize test yield. Lastly, the method further repeats itself at key design checkpoints to revalidate initial test yield (and cost) assumptions made when the product was quoted to a customer. Thus, the method provides increased accuracy of test yield estimate from initial sizing through design and further allows designs to be modified to improve test yield.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the invention has been described in terms of preferred embodiments, those skilled in the art will recognize that the invention can be practiced with modification within the spirit and scope of the appended claims.

What is claimed is:

1. A method for estimating a test yield for a semiconductor product, said method comprising:
   estimating, by a computer and based on critical area analyses, both a front end of line faults sensitivity for each library element in a set of library elements identified in an inventory and a shorts sensitivity for each library element in said set of library elements;
   selecting, by said computer and based at least on requirements for said product, at least two library elements from said set to form said product;
   estimating, by said computer, a wiring faults sensitivity for said product as formed by said at least two library elements; and
   computing, by said computer, a test yield estimate for said product based on said front end of line faults sensitivity for each of said at least two library elements, said shorts sensitivity for each of said at least two library elements and said wiring faults sensitivity for said product.

2. The method of claim 1,
   wherein, for said front end of the line faults sensitivity, a critical area analysis comprises, for each front end of the line masking level, identifying an edge perimeter of said library element and determining a probability of said edge perimeter creating a fault, said front end of the line faults sensitivity being based on probabilities determined for all of said front end of the line masking levels, and
   wherein, for said shorts sensitivity, another critical area analysis comprises calculating a probability that an active edge perimeter of said library element will be positioned adjacent to another active edge perimeter of another library element.

3. The method of claim 1, further comprising maintaining, in a memory of said computer, a database of sensitivity information for each of said library elements in said set.

4. The method of claim 1, further comprising periodically validating, by said processor, said test yield estimate.

5. The method of claim 1, further comprising estimating, by said processor, a cost of manufacturing said product based on said test yield estimate.

6. A method for estimating test yields for a semiconductor product, said method comprising:
   estimating, by a computer and based on critical area analyses, a front end of line faults sensitivity for each library element in a set of library elements identified in an inventory and a shorts sensitivity for each library element in said set of library elements;
   selecting, by said computer and based at least on requirements for said product, at least two groups of library elements such that each group of library elements comprises at least two library elements from said set that, when combined, form said product;

estimating, by said computer and for each group, a wiring faults sensitivity for said product as formed by said at least two library elements in said group;

computing, by said computer, test yield estimates for said product, each test yield estimate being associated with formation of said product using said at least two library elements from a specific group, said test yield estimate being based on said front end of line faults sensitivity for each of said at least two library elements in said specific group, said shorts sensitivity for each of said at least two library elements in said specific group and said wiring faults sensitivity for said product as formed with said at least two library elements in said specific group; and selecting, by said computer, one of said groups to form said product based on a comparison of said test yield estimates.

7. The method of claim 6, wherein, for said front end of the line faults sensitivity, a critical area analysis comprises, for each front end of the line masking level, identifying an edge perimeter of said library element and determining a probability of said edge perimeter creating a fault, said front end of the line faults sensitivity being based on probabilities determined for all of said front end of the line masking levels, and wherein, for said shorts sensitivity, another critical area analysis comprises calculating a probability that an active edge perimeter of said library element will be positioned adjacent to another active edge perimeter of another library element.

8. The method of claim 6, further comprising maintaining, in a memory of said computer, a database of sensitivity information for each of said library elements in said set.

9. The method of claim 6, further comprising periodically validating, by said computer, said test yield estimate.

10. A program storage device readable by a computer and tangibly embodying a program of instructions executable by said computer to perform a method of estimating a test yield for a semiconductor product, said method comprising:

estimating, based on critical area analyses, a front end of line faults sensitivity for each library element in a set of library elements identified in an inventory and a shorts sensitivity for each library element in said set of library elements;

selecting, based at least on requirements for said product, at least two library elements from said set to form said product;

estimating a wiring faults sensitivity for said product formed with said at least two library elements; and computing a test yield estimate for said product based on said front end of line faults sensitivity for each of said at least two library elements, said shorts sensitivity for each of said at least two library elements and said wiring faults sensitivity for said product.

11. The program storage device of claim 10, said estimating of said shorts sensitivity comprising performing a critical area analysis.

12. The program storage device of claim 10, said method further comprising maintaining, in a memory, a database of sensitivity information for each of said library elements in said set.

13. The program storage device of claim 10, said method further comprising periodically validating said test yield estimate.

* * * * *